United States Patent [19]

Miyadera et al.

[11] Patent Number: 5,580,631
[45] Date of Patent: Dec. 3, 1996

[54] OPTICAL RECORDING MEDIUM AND OPTICAL RECORDING METHOD

[75] Inventors: Toshiyuki Miyadera; Takashi Chuman; Takashi Yamada; Fumio Matsui, all of Tsurugashima, Japan

[73] Assignee: Pioneer Electronic Corporation, Tokyo-to, Japan

[21] Appl. No.: 147,947

[22] Filed: Nov. 5, 1993

[30] Foreign Application Priority Data

Nov. 10, 1992 [JP] Japan .................................... 4-299388
Nov. 10, 1992 [JP] Japan .................................... 4-299390

[51] Int. Cl.$^6$ ..................................................... B32B 3/00
[52] U.S. Cl. ....................... 428/64.8; 428/195; 428/209; 428/457; 428/913; 430/945
[58] Field of Search ................... 346/76 L, 135.1; 428/64, 65, 195, 411.1, 457, 913; 430/945

[56] References Cited

U.S. PATENT DOCUMENTS 5,190,800  3/1993  Yamada et al. ........................ 428/64
5,204,220  4/1993  Yanagisaua et al. ................. 430/275
5,238,723  8/1993  Yoshizawa et al. .................... 428/64

Primary Examiner—B. Hamilton Hess
Attorney, Agent, or Firm—Kane, Dalsimer, Sullivan, Kurucz, Levy, Eisele and Richard LLP

[57] ABSTRACT

An optical recording medium comprises a light transmissive substrate, a record film formed on a surface of the base plate, the record film containing phthalocyanine as a coloring matter, a light-reflection film formed on a surface of the record film, and a protection film formed on a surface of the light-reflection film, the protection film having a thickness capable of preventing the light-reflection film from braking by a deformation thereof in directions to the light-reflection film and the protection film due to a formation of a pit in the record film. The data is recorded in the recording medium by irradiating a light from a side of the light transmissive substrate, melting and sublimating phthalocyanine in the record film to effect the deformation to the directions of the substrate, the light-reflection film and the protection film, and forming a cavity in the substrate and a capsule portion in the record film to cover the cavity, the capsule portion having a composition different from that of the record film.

13 Claims, 3 Drawing Sheets

OPTICAL RECORDING MEDIUM AND OPTICAL RECORDING METHOD

BACKGROUND OF THE INVENTION

The present invention relates to a writable write-once type optical recording medium, in which data can be written, in particular, having stable record properties and a superior resistance to environment after being recorded and also relates to a method of writing data in the optical recording medium.

The conventional optical recording medium, so-called write-once type recording medium, in which data can be written has a record film containing an organic coloring matter such as cyanines or phthalocyanines, which is well known.

When data is written in such an optical recording medium, laser beams are focused on a very small area of the surface of the record film and converted to thermal energy, thereby characteristics of the record film being changed to form pits. In order to smoothly change the property of the record film, the optical recording medium has in general an air-sandwich structure, which has two substrates as base plates each having one surface coated with a record film, and the substrates are arranged so that the recording films are faced to each other. The substrates are formed of a transparent material.

When data is written to the optical recording medium having such structure, the laser beams for writing are irradiated to the record film through the transparent substrate to form in the record film a pit which can be read by a light. When the written data is reproduced and read, laser beams for reading having lower output than that of the laser beams for writing is irradiated to the written record film to read, as an electric signal, the contrast between the portion where a pit is formed and that where no pit is formed.

There is an optical recording medium in which data has previously recorded, that is, ROM (read only memory) type, which is used in the field of voice recording and information processing. This type of the optical recording medium comprises a plastic substrate, a reflection layer on the substrate and a protection layer on the reflection layer, and prepits, which correspond to data to be reproduced, had been already formed on the plastic base plate by injection molding. The reflection layer is formed of a metal such as Au, Ag, Cu or Al. The typical medium of this type is a compact disk, which is referred to as CD. The specification of signal for recording and reading of the compact disk is standardized, and a device for reproducing the compact disk according to the standard is widely used as a compact disk player (a CD player).

The write-once type optical recording medium in which data can be written is the same as the compact disk in the point of using laser beams as a light for reproducing data and having a disk form. Therefore, there is an extensive development of the optical recording medium in which data can be written, which is adapted to the standard of the specification of the compact disk and can be used in the compact disk player as it is, that is, having a superior player ability.

In the development, there has been studied the write-once type optical recording medium in which data can be written, comprising a light transmissive substrate, a record film containing an organic coloring matter which is formed on the substrate, a light-reflection film which is formed on the record film and a protection film which is formed on the light-reflection film.

However, in this type of the optical recording medium, data can be written, for example, in accordance with the following principle. The coloring matter in the record film absorbs the irradiated light and generates thermal energy. The record film and the base plate are deformed and changed in quality by the thermal energy to form a pit.

The protection film is provided for the purpose of preventing the degradation of the record film and the reflection film, and preventing cracks from forming in the optical recording medium in which data can be written. It was, however, proven that, if the record film contains phthalocyanine as a coloring matter, the signal recording characteristics depend on the thickness of the protection film, and normal reproduction becomes impossible when the thickness of the protection film is less than a certain thickness. In detail, in the optical recording medium having a record film containing phthalocyanine, the deformation on the formation of a pit occurs not only in the direction of the substrate but also in the directions of the light-reflection film and the protection film, in contrast with the optical recording medium having a record film containing cyanine as a coloring matter, so that, when the thickness of the protection film is less than a certain thickness, the recording characteristics become deteriorated and if the thickness of the protection film is furthermore decreased, the light-reflection film and the protection film are partly destroyed and normal reproduction becomes impossible.

The pit formed in the optical recording medium in which data can be written is different in a form from that in the read only memory (ROM) type of the optical recording medium, so that the playerability of the optical recording medium in which data can be written for the compact disk player already prevailed is insufficient. The optical recording medium after being recorded as described above has not a sufficient resistance to environment Such as light, temperature and moisture.

SUMMARY OF THE INVENTION

An object of the present invention is to substantially eliminate defects or drawbacks encountered in the prior art described above and to provide an optical recording medium in which data can be written, having stable recording properties and having a superior resistance to environment after being recorded.

Another object of this invention is to provide a method of recording data in the optical recording medium in which data can be written by light to improve the playerability for the compact disk player and the resistance to environment of the medium after being written.

These and other objects can be achieved according to the present invention by providing, in one aspect, an optical recording medium in which data can be written, comprising:

a light transmissive substrate;

a record film formed on a surface of the base plate, the record film containing phthalocyanine as a coloring matter;

a light-reflection film formed on a surface of the record film; and a protection film formed on a surface of the light-reflection film, the protection film having a thickness capable of preventing the light-reflection film from breaking by a deformation thereof in directions to the light-reflection film and the protection film due to a formation of a pit in the record film.

In another aspect, there is provided a method of recording data in the optical recording medium comprising a light transmissive substrate, a record film formed on a surface of the base plate, the record film containing phthalocyanine as a coloring matter, a light-reflection film formed on a surface of the record film, and a protection film formed on a surface of the light-reflection film, the protection film having a thickness capable of preventing the light-reflection film from breaking by a deformation thereof in directions to the light-reflection film and the protection film due to a formation of a pit in the record film, the method comprising the steps of:

irradiating a light from a side of the light transmissive substrate;

melting and sublimating phthalocyanine in the record film to effect the deformation to the directions of the substrate, the light-reflection film and the protection film; and forming a cavity in the substrate and a capsule portion in the record film to cover the cavity, the capsule portion having a composition different from that of the record film.

In the preferred embodiments of the optical medium and the method described above, the light irradiated from the substrate side is a laser beam having a writing power of 1 to 15 mw, preferably 5 to 10 mw. The light is a laser beam having a writing power of 1 to 15 mw, preferably 5 to 10 mw. The protection film has a thickness of 2.5 µm or more, preferably 3.0 µm or more.

The phthalocyanine has a formula I

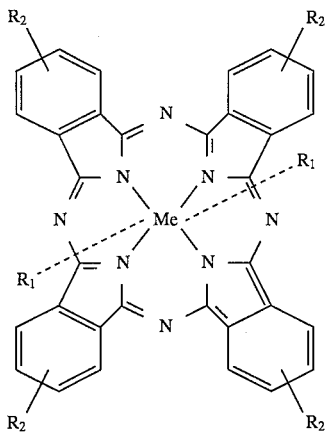

[I]

in which $R_1$ is alkyl which has one or more substituents, hydrogen, halogen, hydroxyl, $-OR_{15}$, $-SR_{15}$, $-SeR_{15}$, $-TeR_{15}$ or the following group:

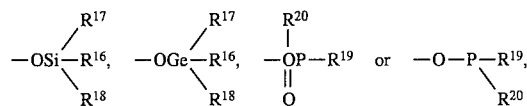

$R_{15}$ is alkyl, aryl or cycloalkyl, these three groups having one or more substituents, or polyeter, $R_{16}$, $R_{17}$ and $R_{18}$ is identical or different one another, and is alkyl, cycloalkyl, aryl, alkoxy or aryloxy, these five groups having one or more substituents, or polyether, hydroxyl, or hydrogen, $R_{19}$ and $R_{20}$ may be identical or different each other, and is alkyl, cycloalkyl or aryl, these three substituents having one or more substituents, $R_2$ is, independently one another, alkyl, alkoxy or a hetelocyclic residue, these three group having one or more substituents, or halogen, nitro, cyano or sulfone, and Me is metal, preferably silicon, vanadium, iron or aluminium.

The phthalocyanine has a formula II

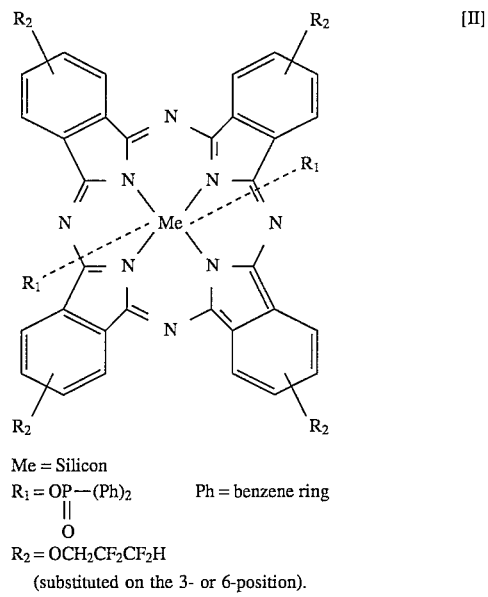

Me = Silicon
$R_1 = OP-(Ph)_2$   Ph = benzene ring
$\phantom{R_1 = O}\|$
$\phantom{R_1 = OP}O$
$R_2 = OCH_2CF_2CF_2H$
(substituted on the 3- or 6-position).

The protection film comprises an ultraviolet- cured acrylate resin.

The further nature and features of the present invention will be made more clear from the following descriptions with reference to the accompanying drawings.

DESCRIPTION OF THE PREFERRED EMBODIMENT

An embodiment of the present invention will be described hereunder with reference to the drawings.

Figure 1:
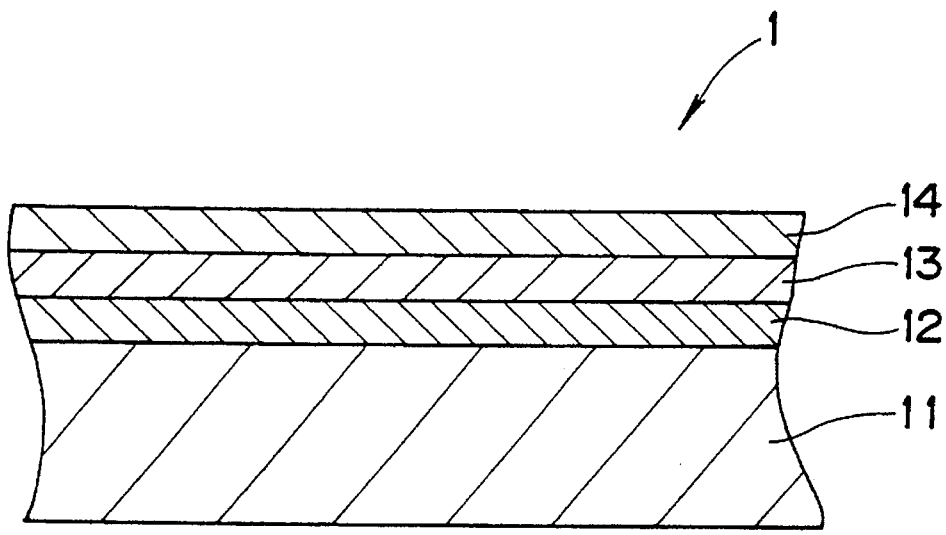
FIG. 1 is a partial cross sectional view showing an optical recording medium according to one embodiment of the present invention.

FIG. 1 is a partial cross sectional view of an optical recording medium according to an embodiment of the present invention which is adapted to the standard of the compact disk. As shown in FIG. 1, an optical recording medium 1 according to the present invention comprises a light transmissive substrate 11 as a base plate, a record film 12 formed on one side surface of the substrate 11, a light-reflection film 13 formed on one side surface (on the side apart from the substrate) of the record film 12 and a protection film 14 formed on one side surface (on the side apart from the record film) of the light-reflection film.

The light transmissive substrate 11 has a disk form, and on one side surface of the substrate 11, pre-grooves for tracking are formed in a form of concentric circles or a spiral form. The substrate plate having the pre-grooves is preferably manufactured by using a substrate of resin integrally formed by injection molding, for example, from a transparent material such as polycarbonate resin (PC) or polymethylmethacrylate resin (PMMA). In stead of the substrate of resin integrally formed by injection molding, a substrate formed by a photo-polymer method can be used. The thickness of the base plate 11 is about 1.0 to 1.5 mm.

The record film 12 is formed on the substrate plate 11. The record film 12 contains phthalocyanine as a coloring matter.

Phthalocyanine represents the following formula I:

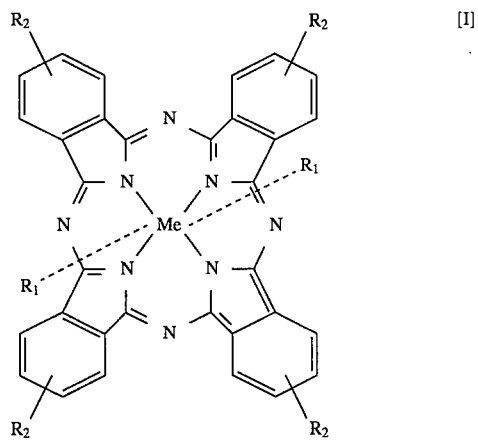

in which $R_1$ is alkyl which may have one or more substituents, hydrogen, halogen, hydroxyl, $-OR_{15}$, $-SR_{15}$, $-SeR_{15}$, $-TeR_{15}$ or the following group:

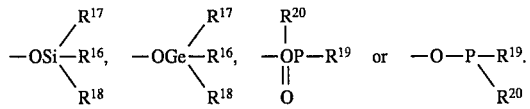

$R_{15}$ is alkyl, aryl or cycloalkyl, these three groups being optionally have one or more substituents, or polyether.

$R_{16}$, $R_{17}$ and $R_{18}$ may be identical or different one another, and is alkyl, cycloalkyl, aryl, alkoxy or aryloxy, these five groups being optionally have one or more substituents, or polyether, hydroxyl, or hydrogen.

$R_{19}$ and $R_{20}$ maybe identical or different each other, and is alkyl, cycloalkyl or aryl, these three substituents being optionally have one or more substituents.

$R_2$ is, independently one another, alkyl, alkoxy or a hetelocyclic residue, these three groups being optionally have one or more substituents, or halogen, nitro, cyano or sulfone.

Me is metal, preferably silicon, vanadium, iron or aluminium.

The record film 12 containing such a coloring matter as a main component is formed on the substrate 11 by a conventional method such as a spin-coat method.

The thickness of the formed record film 12 is 10 to 1,000 nm, preferably 100 to 500 nm. If the thickness thereof is less than 10 nm, the sensitivity of recording becomes insufficient and ideal recording will not be expected, and if the thickness is more than 1,000 nm, the rate of reflection becomes insufficient.

Any known solvent can be used in forming the record film 12 on the substrate 11, for example, diacetone alcohol, 2-2-ethoxyethanol, 2-methoxyethanol, isophorone, methanol or tetrafluoropropanol.

The light-reflection film 13 is formed on the record film 12. The light-reflection film 13 is formed of a metal such as Au, Al, Ag or Cu, and is formed by, for example, vacuum evaporation, spattering or ion plating. The thickness of the light-reflection film 13 is about 0.02 to about 2.0 μm.

The protection film 14 is formed on the light-reflection film 13 to protect the record film 12 and the light-reflection film 13. The protection film 14 is formed, in general, by applying a ultraviolet-cured resin by spin-coating, irradiating an ultraviolet ray to the resin to cure the resin. The other resins such as epoxy resin, acrylic resin, silicone resin or urethan resin may be also used as a material for the protection film 14.

Figure 2:
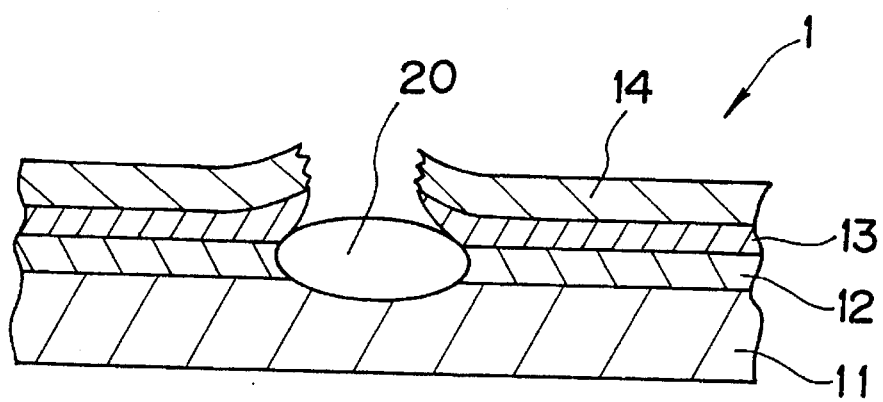
FIG. 2 schematically shows an example an optical recording medium having deformation formed by the formation of a pit.
Figure 3:
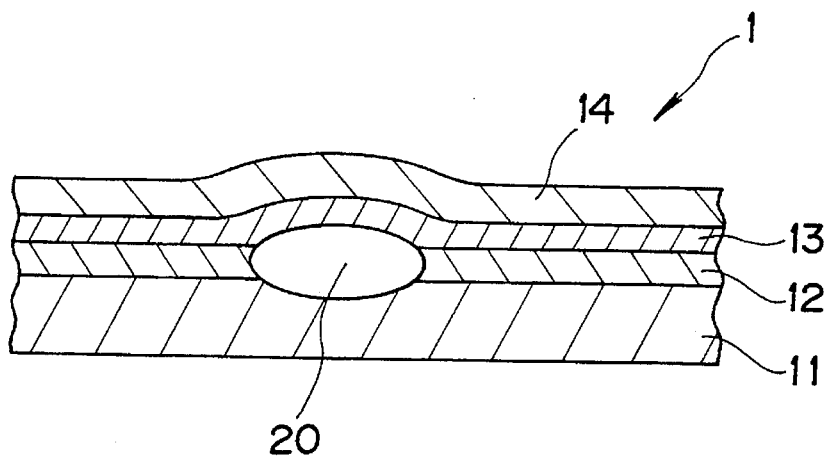
FIG. 3 schematically shows another example of an optical recording medium having deformation formed by the formation of a pit.

The protection film 14 has such thickness as to prevent the light-reflection film 13 from breaking by the formation of the pit 20 in the record film 12 to change the shapes of the light-reflection film 13 and the protection film 14. If the protection film 14 is too thin, the shapes of the light-reflection film 13 and the protection film 14 are changed by the formation of the pit 20 and the reproduced waveform is deteriorated, and if the protection film 14 is furthermore thinner, the light-reflection film 13 and the protection film 14 are partially broken, thereby the normal reproduction being impossible, as shown in FIG. 2. The protection film 14 in the optical recording medium according to the present invention has such thickness as to prevent such breaking, so that the normal reproduction is stably carried out, as shown in FIG. 3.

The thickness of the protection film 14 is, in general, 2.5 μm or more, preferably, 3.0 μm or more. The ultraviolet-cured resin being too thick can not be efficiently cured by ultraviolet rays, so the thickness of the protection film 14 comprising the ultraviolet-cured resin is preferably 50 μm or less.

The substrate 11 can be covered on the side opposite to the side on which the record film 12 is formed by a top coat film for adjusting the rate of reflection comprising organic materials. An intermediate layer for protecting the substrate 11 from the solvent which is used in forming the record film 12 on the substrate 11 can be provided between the base plate 11 and the record film 12.

When data is written in the optical recording medium according to the present invention, a recording light is irradiated from the side of the substrate 11 to the record film 12 while the optical recording medium is rotated. The recording light is a light, preferably a laser beam, capable of melting and sublimating the phthalocyanine in the record film 12. The laser beam which has, in general, a writing power of about 1 to 15 mw, preferably, about 5 to 10 mw is used.

Figure 4:
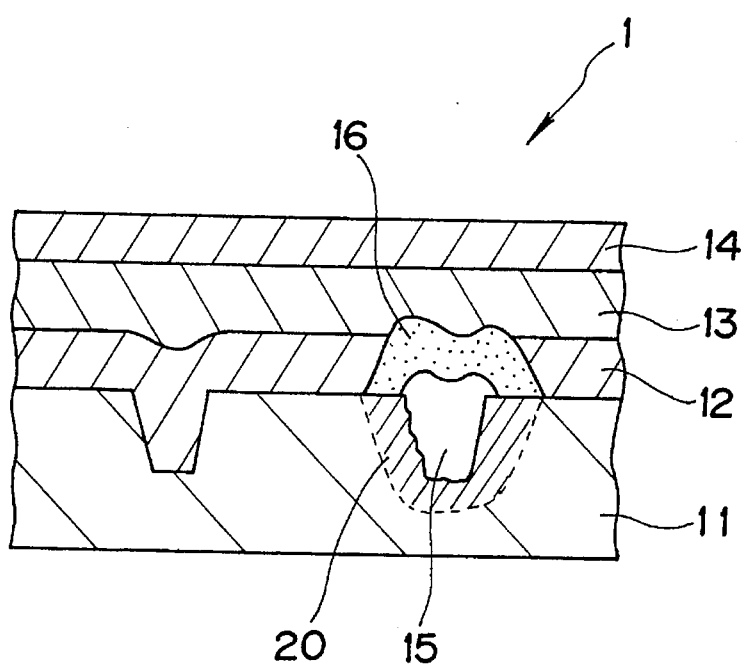
FIG. 4 schematically shows one example of an optical recording medium having deformation and change of quality formed by the formation of pits.

If the laser beam having such writing power is irradiated to the record film 12, the phthalocyanine in the record film 12 is melted and sublimated from the record film 12 to form a cavity 15 in the substrate 11 and form a capsule part 16 covering the cavity 15 in the record film 12, thereby to form a pit, as shown in FIG. 4. When the cavity 15 is formed, a certain portion of the substrate 11 is formed and changed in quality such as a portion 20 in FIG. 2. The capsule part 16 has a composition different from that of the record film 12. The reason is probably that the laser beam is irradiated to melt the portion of the substrate 11 and the melted material of the substrate 11 is mixed with the phthalocyanine in the record film 12 to produce the different composition.

The difference of the composition of the capsule part 16 from that of the record film 12 can be easily confirmed by the phenomenon that, when the record film 12 on the substrate plate 11 is washed out by methanol, the capsule part 16 remains on the substrate plate 11 in the recorded part where a pit is formed, while all of the record film 12 is removed in the un-recorded part.

The capsule part 16 which is formed as described above has a shape very similar to that of the pit of the read only memory type of the optical recording medium (the compact disk), and therefore, the optical recording medium in which data can be written according to the method of the present invention has a superior playability for the compact disk player, such that the signal of a three-beam tracking error is certainly given. The portion of the substrate 11 is deformed and changed in quality when the capsule part 16 is formed, therefore the contrast by the diffraction in the capsule part 16 being combined with the contrast by the change of the optical constant by the deformation and the change of quality, thus the contrast on reading being made clear, and high modulation factor will be expected.

Furthermore, since the capsule 16 is insoluble in a solvent such as methanol, the optical recording medium 11 having pits which is formed by the method according to the present invention is physically and chemically stable and has a superior resistance to environment after being recorded.

The optical recording medium according to the present invention has the stable recording characteristics and the improved resistance to environment after being recorded. Furthermore, the irregularity of the surface of the disk and the performance of the product on quantity production can be prevented.

The present invention will be explained in detail with the following example.

COMPARATIVE EXAMPLE 1

The phthalocyanine of the following formula:

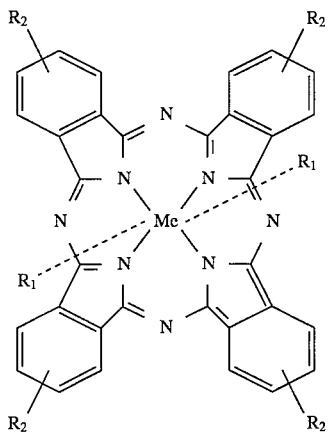

Me = Silicon
$R_1 = OP-(Ph)_2$   Ph = benzene ring
      ||
      O
$R_2 = OCH_2CF_2CF_2H$
(substituted on the 3- or 6-position).

was solved in 2-ethoxyethanol, and the solution is applied to the base plate 11 comprising polycarbonate (PC) having a diameter of 12 cm by a spin-coat method to form the record film 12 having a thickness of 200 nm. A light-reflection film 13 comprising gold (Au) which has a thickness of 1000 angstorm was formed on the record film 12 by the resistance heating type of vacuum evaporation to manufacture the optical recording medium. An EFM signal was recorded and reproduced in the optical recording medium under the following conditions and the reproduction waveform was evaluated.

Recording Conditions: L.V.=1.4 m/s, $\lambda$=785 nm, N.A.=0.5, Written Power: 8.0 mw.

Reproduction Conditions: L.V.=1.4 m/s, $\lambda$=783 nm, N.A.=0.45

Reproducing Power: 0.3 mw.

Figure 6:
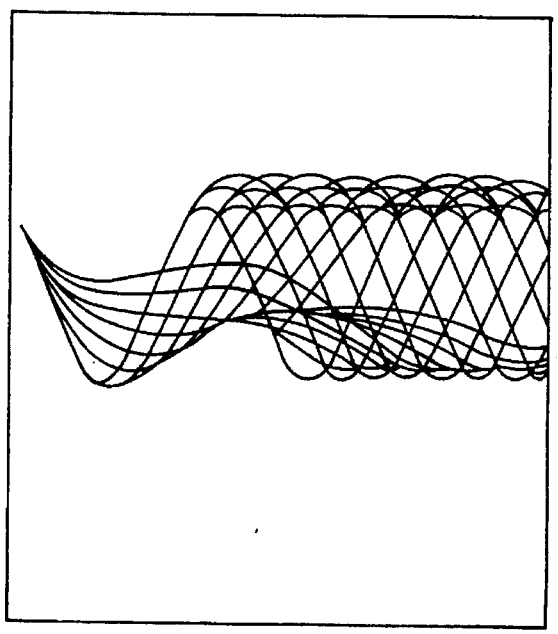
FIG. 6 shows reproduction waveforms of the optical recording medium according to Example 1 and Example 2, described hereinlater.

As a result, the reproduction waveform had severe deflection and the bottoms of the amplitude were markedly humped, as shown in FIG. 6. The tracking after recording was unstable. The optical recording medium after being recorded was observed under a light microscope and it was confirmed that the reflection film and the protection film were broken in the recorded part.

COMPARATIVE EXAMPLE 2

The procedure described in Example 1 was repeated, with the exception that a protection film 14 comprising the ultraviolet-cured acrylate resin having a thickness of 1.2 µm was additionally formed on the light-reflection film 13, to manufacture an optical recording medium. The reproduction waveform for the optical recording medium was evaluated as described in Example 1.

As a result, the reproduction waveform had severe deflection and the bottoms of the amplitude were markedly humped, as shown in FIG. 6. The tracking after being recorded was unstable. The optical recording medium after being recorded was observed under a light microscope and it was confirmed that the reflection film and the protection film were broken in the recorded part.

EXAMPLES 3 to 7

The procedure described in Example 2 was repeated, with the exception that the thickness of the protection film 14 was 1.9, 2.5, 8.0, 9.8 or 15.0 µm.

The reproduction waveform for each of the optical recording mediums was evaluated as described in Example 1.

The thickness of the protection film and the evaluation for each of the optical recording mediums including those of Comparative Examples 1 and 2 are shown in the following Table 1.

TABLE 1

| Ex. | Thickness of Protection Film (µm) | Evaluation |
| --- | --- | --- |
| 1 | 0 | Light-Reflection Film - broken Unstable Tracking |
| 2 | 1.2 | Light-Reflection Film - broken Unstable Tracking |
| 3 | 1.9 | Light-Reflection Film - not broken Unclear Reproduction - Waveform Unstable Tracking |
| 4 | 2.5 | Normal |
| 5 | 8.0 | Normal |
| 6 | 9.8 | Normal |
| 7 | 15.0 | Normal |

EXAMPLE 8

The procedure described in Example 1 was repeated, with the exception that a protection film 14 of the ultraviolet-cured acrylate resin having a thickness of 4.0 µm was additionally formed on the light-reflection film 13, to manufacture an optical recording medium.

The reproduction waveform for the optical recording medium was evaluated as described in Example 1.

As a result, it was confirmed that the stable reproducing waveform could be obtained, so the normal recording can be stably carried out.

The resistance to environment for the optical recording medium after being recorded was evaluated under a temperature of 60° C. and a relative humidity of 90% by an accelerated environmental test. It was found that the medium had characteristics almost identical with the initial characteristics even after 2000 hours.

Furthermore, the light-reflection film 13 and the protection film 14 were removed from the optical recording medium in which data was recorded to expose the record film 12, and the record film 12 was washed out by methanol and observed by an electron microscope. It was confirmed that the most part of the record film 12 was removed and the capsule part 16 was formed.

COMPARATIVE EXAMPLE 9

The procedure described in Example 8 was repeated, with the exception that an optical recording medium having a record film containing cyanine as a coloring matter was used instead of that having a record film containing phthalocyanine. The EFM signal was recorded and reproduced as described in Example 1 and the resistance to environment for the optical recording medium after being recorded was evaluated under a temperature of 60° C. and a relative humidity of 90%. The deterioration of the signal was confirmed after 500 hours.

Furthermore, the light-reflection film and the protection film were removed out from the optical recording medium in which data was recorded to expose the record film, and the record film 12 was washed out by methanol and observed by an electron microscope. It was observed that the all part of the record film was removed and no capsule part was formed.

Figure 5:
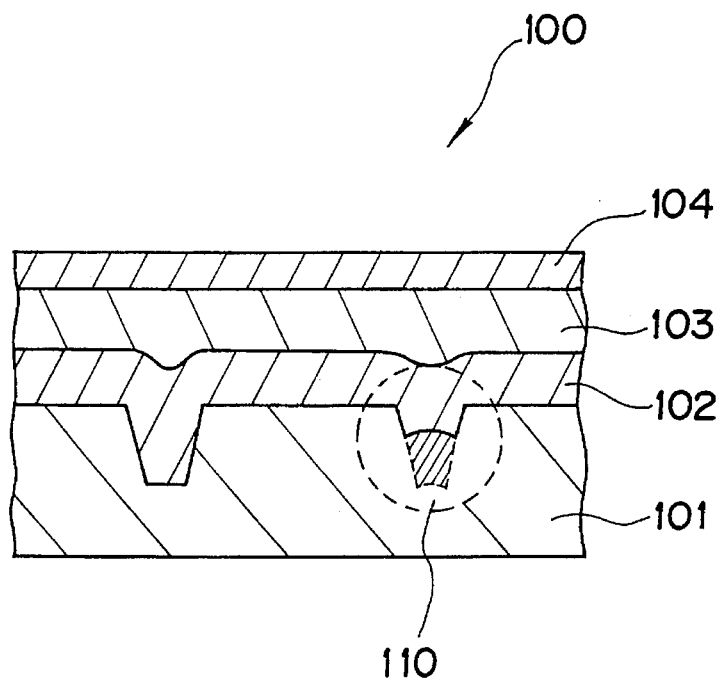
FIG. 5 schematically shows another example of a conventional optical recording medium having deformation and the change of quality formed by the formation of pits.

Accordingly, it was found the recording principle was different from that of the optical recording medium having a record film containing phthalocyanine, as shown in FIG. 5 showing a conventional example. In FIG. 5, the optical recording medium 100 has a substrate 101, a record film 102 containing cyanine as a coloring matter, a light reflection film 103 and a protection film 104. A reference numeral 110 denotes a deformed and quality changed portion.

What is claimed is:

1. A write-once optical recording medium in which data is written and which is capable of being reproduced by a compact disk player, comprising:

a light transmissive substrate;

a record film formed on a surface of the light transmissive substrate, said record film containing phthalocyanine as a coloring matter expressed by the following formula;

a light-reflection film formed on a surface of the record film; and a protection film formed on a surface of the light-reflection film, said protection film having a thickness capable of preventing the light-reflection film from breaking due to a deformation of the record film in directions of the light-reflection film and the protection film due to a formation of a pit in the record film,

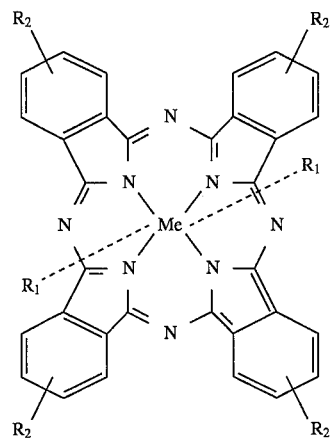

in which $R_1$ is alkyl which has one or more substituents, hydrogen, halogen, hydroxyl, $-OR_{15}$, $-SR_{15}$, $-SeR_{15}$, $-TeR_{15}$ or the following group:

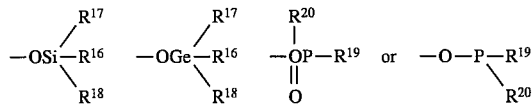

$R_{15}$ is alkyl, aryl or cycloalkyl, these three groups having one or more substituents, or polyether, $R_{16}$, $R_{17}$ and $R_{18}$ is identical or different from one another, and is alkyl, cycloalkyl, aryl, alkoxy or aryloxy, these five groups having one or more substituents, or polyether, hydroxyl, or hydrogen, $R_{19}$ and $R_{20}$ may be identical or different from each other, and is alkyl, cycloalkyl or aryl, these three substituents having one or more substituents, $R_2$ is, independently of one another, alkyl, alkoxy or a hetelocyclic residue, these three groups having one or more substituents, or halogen, nitro, cyano or sulfone, and Me is metal.

2. A write-once optical recording medium according to claim 1 wherein the protection film has a thickness of 2.5 μm or more.

3. The write once optical recording medium of claim 2 wherein the protection film has a thickness of 3.0 μm or more.

4. A write-once optical recording medium according to claim 1, wherein the phthalocyanine of formula is a phthalocyanine having a formula as follows:

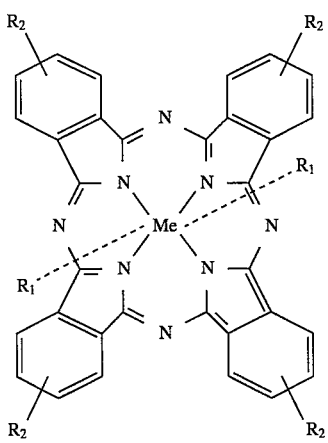

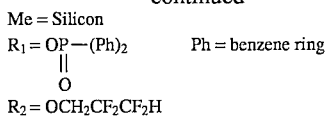

Me = Silicon
$R_1 = OP-(Ph)_2$   Ph = benzene ring
$\parallel$
O
$R_2 = OCH_2CF_2CF_2H$

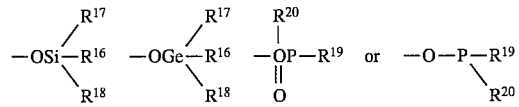

$R_{15}$ is alkyl, aryl or cycloalkyl, these three groups having one or more substituents, or polyether, $R_{16}$, $R_{17}$ and $R_{18}$ is identical or different from one another, and is alkyl, cycloalkyl, aryl, alkoxy or aryloxy, these five groups having one or more substituents, or polyether, hydroxyl, or hydrogen, $R_{19}$ and $R_{20}$ may be identical or different from each other, and is alkyl, cycloalkyl or aryl, these three substituents having one or more substituents, $R_2$ is, independently of one another, alkyl, alkoxy or a hetelocyclic residue, these three groups having one or more substituents, or halogen, nitro, cyano or sulfone, and Me is metal.

5. A write-once optical recording medium according to claim 1, wherein the protection film comprises an ultraviolet-cured acrylate resin.

6. The write once optical recording medium of claim 1 wherein M is selected from the group consisting of silicon vanadium, iron, and aluminum.

7. A method of recording data in a write-once optical recording medium which comprises a light transmissive substrate, a record film formed on a surface of the light transmissive substrate, said record film containing phthalocyanine as a coloring matter expressed by the following formula, a light-reflection film formed on a surface of the record film, and a protection film formed on a surface of the light-reflection film, said protection film having a thickness capable of preventing the light-reflection film from breaking due to a deformation of the record film in directions of the light-reflection film and the protection film due to a formation of a pit in the record film, the method comprising the steps of:

irradiating a light from a side of the light transmissive substrate;

melting and sublimating phthalocyanine in the record film to effect a deformation to the directions of the substrate, the light-reflection film and the protection film; and forming a cavity in the substrate and a capsule portion in the record film to cover the cavity having a composition different from that of the record film to thereby form a recording pit capable of being reproduced by a compact disk player,

8. A method according to claim 7, wherein the light irradiated from the substrate side is a laser beam having a writing power of 1 to 15 mw.

9. The method of recording data according to claim 7, the light is a laser beam having a writing power of 1 to 15 mw.

10. A method according to claim 8, wherein the protection film has a thickness of 2.5 μm or more.

11. A method according to claim 7, wherein the phthalocyanine has a formula II

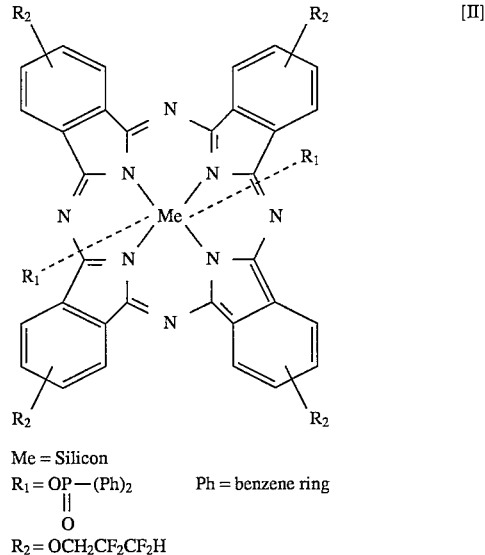

Me = Silicon
$R_1 = OP-(Ph)_2$   Ph = benzene ring
$\parallel$
O
$R_2 = OCH_2CF_2CF_2H$

12. A process optical recording medium according to claim 7, wherein the protection film comprises an ultraviolet- cured acrylate resin.

13. The method of claim 7 wherein M is selected from the group consisting of silicon vanadium, iron, and aluminum.

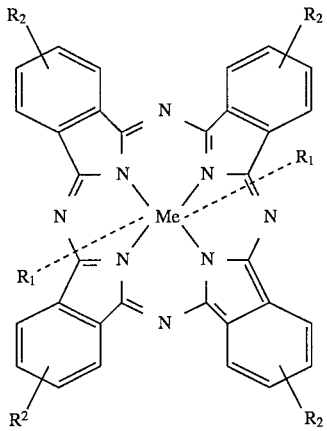

in which $R_1$ is alkyl which has one or more substituents, hydrogen, halogen, hydroxyl, $-OR_{15}$, $-SR_{15}$, $-SeR_{15}$, $-TeR_{15}$ or the following group:

* * * * *